United States Patent
Liu (10) Patent No.: US 10,152,580 B2
(45) Date of Patent: Dec. 11, 2018

(54) INTERACTION METHOD AND DISPLAY DEVICE

(71) Applicant: Beijing Zhigu Rui Tuo Tech Co., Ltd., Beijing (CN)

(72) Inventor: Jia Liu, Beijing (CN)

(73) Assignee: Beijing Zhigu Rui Tuo Tech Co., Ltd., Beijing (CN)

( * ) Notice: Subject to any disclaimer, the term of this patent is extended or adjusted under 35 U.S.C. 154(b) by 132 days.

(21) Appl. No.: 15/200,675

(22) Filed: Jul. 1, 2016

(65) Prior Publication Data

US 2017/0004329 A1   Jan. 5, 2017

(30) Foreign Application Priority Data

Jul. 3, 2015   (CN) .......................... 2015 1 0387118

(51) Int. Cl.
| | | |
|---|---|---|
| G06F 21/00 | (2013.01) |
| G06F 21/31 | (2013.01) |
| G06F 3/0488 | (2013.01) |
| G06F 3/0484 | (2013.01) |
| G06F 17/22 | (2006.01) |

(52) U.S. Cl.
CPC ............ G06F 21/31 (2013.01); G06F 3/0484 (2013.01); G06F 3/0488 (2013.01); *G06F 17/2264* (2013.01); *G06F 2203/04808* (2013.01); *G06F 2221/2113* (2013.01)

(58) Field of Classification Search
CPC .. G06F 21/6218; G06F 21/6245; G06F 21/32; G06F 21/84; G06F 21/554; G06F 21/60; G06F 21/00
See application file for complete search history.

(56) References Cited

U.S. PATENT DOCUMENTS

| | | | | |
|---|---|---|---|---|
| 2011/0251954 A1* | 10/2011 | Chin | ................... | G06F 3/04883 705/40 |
| 2016/0125193 A1* | 5/2016 | Dai Zovi | ............ | G06F 21/6209 726/28 |
| 2016/0171192 A1* | 6/2016 | Holz | ....................... | G06F 21/31 726/19 |

FOREIGN PATENT DOCUMENTS

| | | |
|---|---|---|
| CN | 101370209 A | 2/2009 |
| CN | 101815119 A | 8/2010 |
| CN | 103873442 A | 6/2014 |
| JP | 2013-68865 A | 4/2013 |

* cited by examiner

*Primary Examiner* — Ghazal B Shehni
(74) *Attorney, Agent, or Firm* — Sheppard Mullin Richter & Hampton LLP (57) ABSTRACT

The embodiments of the present invention provide an interaction method and a display device. The interaction method comprises: determining, by a display device, first information at least according to a contact manner between the display device and a user; obtaining third information at least according to the first information and second information to be provided for the user; and displaying the third information. The embodiments of the present invention provide an interaction solution.

19 Claims, 5 Drawing Sheets

INTERACTION METHOD AND DISPLAY DEVICE

BACKGROUND

Technical Field

The embodiments of the present invention relate to the technical field of interaction, in particular, to an interaction method and a display device.

Related Art

Many electronic devices are provided with display screens. A user is used to check various pieces of information on a display screen, comprising privacy information of the user. However, information displayed on the display screen is easily saw by other users, the privacy information of the user is possibly stolen by a malicious user, and thus a secure solution is required.

SUMMARY

In view of the above, an objective of the embodiments of the present invention is to provide an interaction solution.

For the objective, a first aspect of the embodiments of the present invention provides an interaction method, comprising:

determining, by a display device, first information at least according to a contact manner between the display device and a user;

obtaining third information at least according to the first information and second information to be provided for the user; and displaying the third information.

For the objective, a second aspect of the embodiments of the present invention provides a display device, comprising:

a determining module, configured to determine first information at least according to a contact manner between the display device and a user;

an obtaining module, configured to obtain third information at least according to the first information and second information to be provided for the user; and a display module, configured to display the third information.

For the objective, a third aspect of the embodiments of the present invention provides a display device, comprising:

at least one display screen, configured to display;

a memory, configured to store an instruction;

a processor, configured to execute the instruction stored by the memory, wherein the instruction enables the processor to execute the following operations:

determining first information at least according to a contact manner between a display device and a user;

obtaining third information at least according to the first information and second information to be provided for the user; and controlling the at least one display screen to display the third information.

At least one of above technical solutions has the following beneficial effects:

According to the embodiments of the present invention, first information is determined by a display device at least according to a contact manner between the display device and a user, third information is obtained at least according to the first information and second information to be provided for the user, and the third information is displayed, thereby providing an interaction solution. Specifically, the user provides assistant information for disguising real information to the display device in a relatively secret contact manner, and the display device displays the disguise information of the real information according to the assistant information to cause the user to restore the displayed disguise information to the real information, thereby improving security and privacy.

DETAILED DESCRIPTION

Specific implementing manners of the present invention are described in further detail below with reference to the accompanying drawings and embodiments. The following embodiments are only intended to describe the present invention, but not to limit the scope of the present invention.

Figure 1:
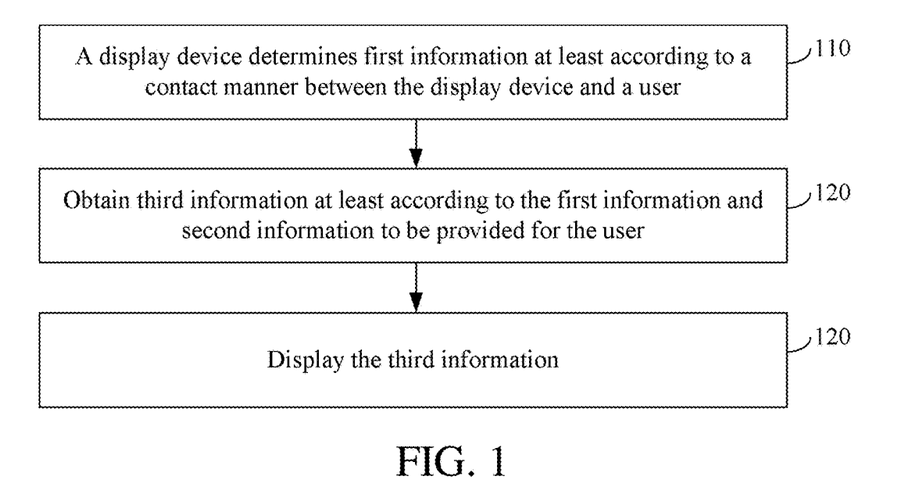
FIG. 1 is a schematic flow chart of an embodiment of an interaction method provided by the present invention.

FIG. 1 is a schematic flow chart of an embodiment of an interaction method provided by the present invention. As shown in FIG. 1, this embodiment comprises:

110: A display device determines first information at least according to a contact manner between the display device and a user.

In this embodiment, the display device can be any device having a display function, comprising but not limited to: a cellphone, a tablet computer, a wearable device and a display.

In this embodiment, the contact manner between the display device and the user generally is controlled by the user, and correspondingly, the first information is equivalently provided for the display device by the user through the contact manner. Since only the two contact parties can clearly perceive the contact manner of the two parties, that is, the user and the display device can clearly perceive the contact manner, it is generally difficult for the contact manner to be clearly perceived by another user other than the user in the contact process between the user and the display device in the contact manner, and correspondingly, it is impossible for the another user to determine the first information.

120: Obtain third information at least according to the first information and second information to be provided for the user.

In this embodiment, the second information is optionally privacy information, comprising any one of the following: an account, a password and a command.

In this embodiment, the second information optionally consists of at least one character.

In this embodiment, the third information is different from the second information, wherein the second information is information that the display device really wants to provide for the user and can be called as real information; the third information can be regarded as disguised second information and can be called as disguise information correspondingly; and the first information can assist the user in restoring the disguise information to the real information and is called as assistant information correspondingly.

130: Display the third information.

In this embodiment, the display device optionally comprises a display screen, displaying the third information by the display device specifically is displaying the third information on the display screen, and correspondingly, all users located within a view angle range of the display screen can see the third information.

According to this embodiment, first information is determined by a display device at least according to a contact manner between the display device and a user, third information is obtained at least according to the first information and second information to be provided for the user, and the third information is displayed, thereby providing an interaction solution. Specifically, the user provides assistant information for disguising real information to the display device in a relatively secret contact manner, and the display device displays the disguise information of the real information according to the assistant information to cause the user to restore the displayed disguise information to the real information, thereby improving security and privacy.

This embodiment of the method is further described in some optional implementing manners.

In this embodiment, there is a plurality of implementing manners for 120.

In an optional implementing manner, the obtaining third information at least according to the first information and second information to be provided for the user comprises:

obtaining the third information by transforming all or part of the second information at least according to the first information.

The first information is associated with the transformation.

Optionally, the first information indicates a transformation rule. Correspondingly, the obtaining the third information by transforming all or part of the second information at least according to the first information comprises:

obtaining the third information by transforming all or part of the second information according to the transformation rule.

The transformation rule can be a transformation rule in any type, comprising but not limited to: out-of-order transformation, operation transformation and mapping transformation. The out-of-order transformation means change of a sequence of all or part of characters. For example, the transformation rule is to reverse the sequence of all characters; and correspondingly, if the second information is 1A2B3C, the third information is C3B2A1. For another example, the transformation rule is to circularly move the last three characters rightwards by 1 bit; correspondingly, if the second information is 1A2B3C, the third information is 1A2CB3. The operation transformation means certain operation on all or part of characters. For example, the transformation rule is to add 2 to each number; correspondingly, if the second information is 1A2B3C, the third information is 3A4B5C. The mapping transformation means that all or part of characters are mapped to be characters in another system different from the system of the corresponding characters. For example, the transformation rule is to map each number to be an English letter of a serial number corresponding to the number; and if the second information is 123456, the third information is ABCDEF.

The transformation indicated by the transformation rule generally is reversible, and correspondingly, the user can perform reverse transformation of the transformation indicated by the transformation rule on the third information to obtain the second information.

The transformation rule generally is determined by a transformation manner and at least one transformation parameter. Correspondingly, the first information comprises the transformation manner and at least one transformation parameter of the transformation rule, or the first information comprises at least one transformation parameter of the transformation rule. Specifically, if the first information only comprises the at least one transformation parameter of the transformation rule, the transformation manner of the transformation rule generally is predetermined by the display device and the user.

For example, the transformation manner of the first information is to add a natural number to each number, the first information comprising a transformation parameter, 2, is equivalent to that the transformation rule indicated by the first information is to add 2 to each number. For another example, the transformation manner determined by the user and the display device is to circularly move all characters rightwards, and the first information comprising a transformation parameter, 3, is equivalent to that the transformation rule indicated by the first information is to circularly move all characters rightwards by 3 bits.

In this embodiment, the contact manner comprises a plurality of meanings, and correspondingly, there is a plurality of implementing manners for 110. In an optional implementing manner, the contact manner comprises: a holding manner of the display device by the user; correspondingly, the determining, by a display device, first information at least according to a contact manner between the display device and a user comprises that:

determining, by the display device, the first information at least according to the holding manner.

A correspondence between the first information and the holding manner can be predetermined by the user and the display device. Correspondingly, the display device determines the first information according to the correspondence and the holding manner.

The holding manner comprises but not limited to at least one of the following: at least one holding hand, and at least one holding position on the display device.

Figure 2A:
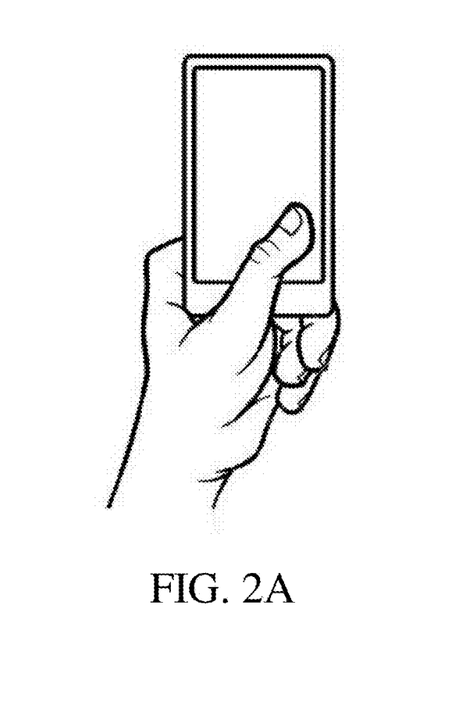
FIG. 2A to FIG. 2C are schematic diagrams of one holding manner.
Figure 2B:
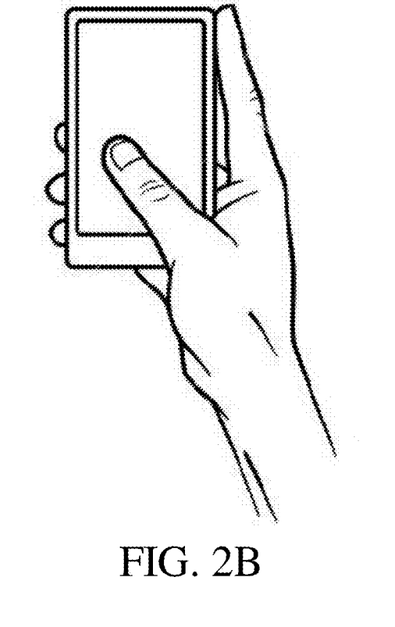
Figure 2C:
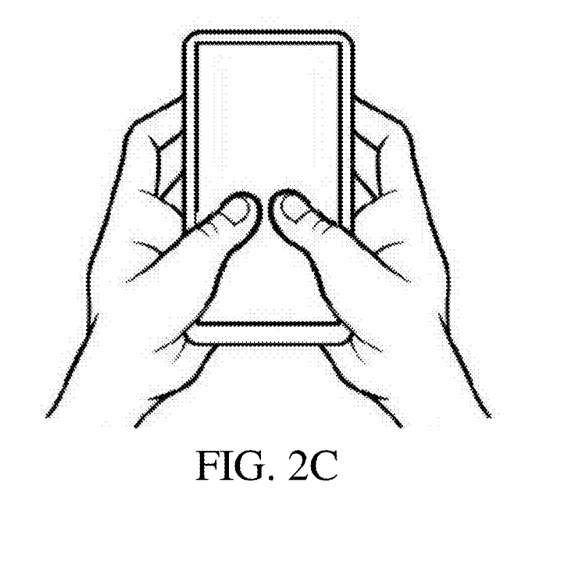

Specifically, at least the number of hands of the user for holding the display device is marked on the at least one holding hand, and the user holds the display device with one hand when the at least one holding hand is one holding hand. Which hand, left hand or right hand, of the user for holding the display device is also optionally marked on the at least one holding hand. For example, the user and the display device predetermine that single hand holding corresponds to first information A (as shown in FIG. 2A and FIG. 2B), and double-hand holding corresponds to first information B (as shown in FIG. 2C); or the user and the display device predetermine that left single hand holding corresponds to first information A (as shown in FIG. 2A), right single hand holding corresponds to first information B (as shown in FIG. 2B) and double-hand holding corresponds to first information C (as shown in FIG. 2C).

Specifically, at least a position and the number of holding points of the user on the display device are marked on the at least one holding position on the display device.

Figure 3A:
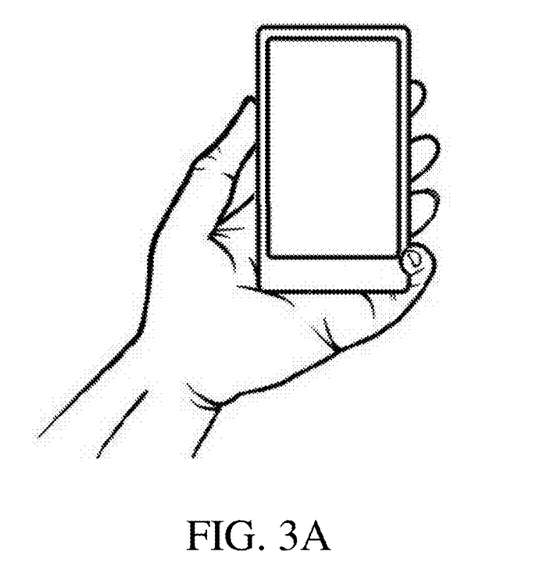
FIG. 3A to FIG. 3C are schematic diagrams of another holding manner.
Figure 3B:
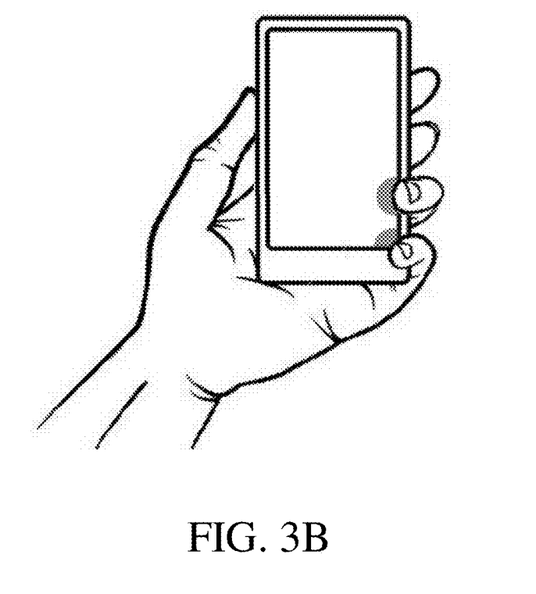
Figure 3C:
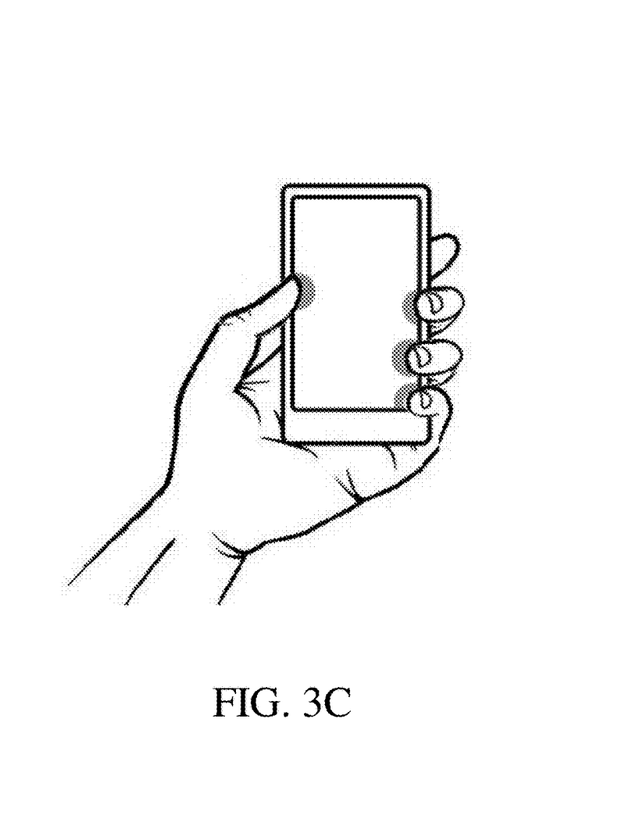

Further, the number of holding points in each region of the display device, for example, the number of the holding points on a display screen of the display device and the number of the holding points on side surfaces of the display device, is optionally marked on the at least one holding position. For example, the user and the display device predetermine that existence of no holding point on the display screen corresponds to first information A (as shown in FIG. 3A), existence of two holding points on the display screen corresponds to first information B (as shown in FIG. 3B) and existence of four holding points on the display screen corresponds to first information A (as shown in FIG. 3A).

In this implementing manner, the display device can determine the holding manner by multiple technologies. For example, at least one holding position on the display device is determined by close monitoring, pressure sensing, etc. Further, the at least one holding hand is determined by hand gesture recognition.

In another optional implementing manner, the contact manner comprises: a touch operation manner of the display device by the user; and correspondingly, the determining, by the display device, first information at least according to a contact manner between the display device and a user comprises:

determining, by the display device, the first information at least according to the touch operation manner.

A correspondence between the first information and the touch operation manner can be predetermined by the user and the display device. Correspondingly, the display device determines the first information according to the correspondence and the touch operation manner.

The touch operation manner comprises but not limited to any one of the following: number of clicks, touch duration, touch pressure and slide pattern. For example, the user and the display device predetermine that the number of clicks, 1, 2, 3, 4, and 5, correspond to the first information, A, B, C, D, and E, respectively. For another example, the user and the display device predetermine that the slide patterns, straight line, circle, square and triangle correspond to the first information A, B, C, D, and E, respectively.

In this implementing manner, the display device can determine the touch operation manner by multiple technologies, for example, the touch operation manner by touch perception of a capacitance screen.

In another optional implementing manner, the touch manner comprises: the holding manner of the display device by the user and the touch operation manner of the display device by the user. Correspondingly, the determining, by a display device, first information at least according to a contact manner between the display device and a user comprises:

determining, by the display device, the first information at least according to the holding manner and the touch operation manner.

A correspondence between the first information and the holding manner and the touch operation manner can be predetermined by the user and the display device. Correspondingly, the display device determines the first information according to the correspondence, the holding manner and the touch operation manner.

Meanings of the holding manner and the touch operation manner can refer to corresponding description in above implementing manners.

For example, the user and the display device predetermine that number of clicks, 1, 2, 3, 4, and 5, in a single hand holding state correspond to the first information, A, B, C, D, and E, respectively, and the number of clicks, 1, 2, 3, 4, and 5, in a double-hand holding state correspond to the first information, F, G, H, I and J, respectively.

Figure 4:
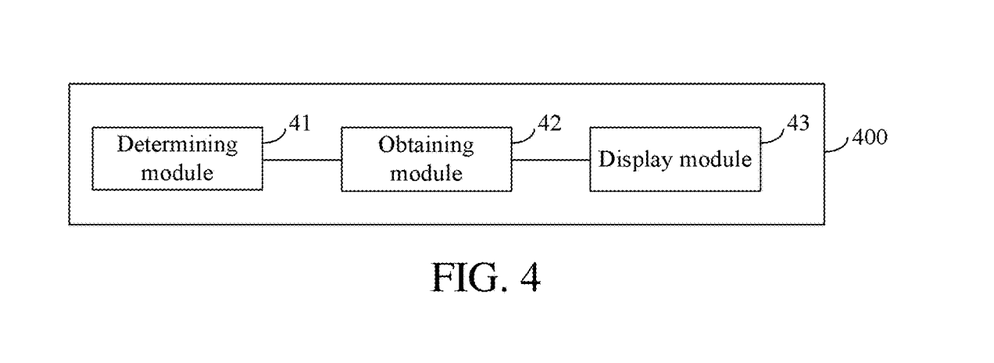
FIG. 4 is a schematic structural diagram of a first embodiment of a display device provided by the present invention.

FIG. 4 is a schematic structural diagram of a first embodiment of a display device provided by the present invention. As shown in FIG. 4, the display device 400 comprises:

a determining module 41, configured to determine first information by a display device at least according to a contact manner between the display device 400 and a user;

an obtaining module 42, configured to obtain third information at least according to the first information and second information to be provided for the user; and a display module 43, configured to display the third information.

In this embodiment, the display device 400 can be any device having a display function, comprising but not limited to a cellphone, a tablet computer, a wearable device and a display.

In this embodiment, a contact manner between the display device 400 and a user generally is controlled by the user. Correspondingly, the first information is equivalently provided for the display device 400 by the user through the contact manner. Since only the two contact parties can clearly perceive the contact manner of the two parties, that is, the user and the display device 400 can clearly perceive the contact manner, it is generally difficult for the contact manner to be clearly perceived by another user other than the user in the contact process between the user and the display device 400 in the contact manner, and correspondingly, it is impossible for the another user to determine the first information.

In this embodiment, the second information is optionally privacy information, comprising but not limited to any one of the following: an account, a password and a command.

In this embodiment, the second information optionally consists of at least one character.

In this embodiment, the third information is different from the second information, wherein the second information is information that the display device 400 really wants to provide for the user and can be called as real information; the third information can be regarded as disguised second information and can be called as disguise information correspondingly; and the first information can assist the user in restoring the disguise information to the real information and is called as assistant information correspondingly.

In this embodiment, the display device 400 optionally comprises a display screen, displaying the third information by the display module 43 specifically is displaying the third information on the display screen, and correspondingly, all users located within a view angle range of the display screen can see the third information.

According to the display device of this embodiment, first information is determined by the determining module at least according to a contact manner between the display device and a user, the obtaining module obtains third information at least according to the first information and second information to be provided for the user, and the display module displays the third information, thereby providing an interaction solution. Specifically, the user provides assistant information for disguising real information to the display device in a relatively secret contact manner, and the display device displays the disguise information of the real information according to the assistant information to cause the user to restore the displayed disguise information to the real information, thereby improving security and privacy.

This embodiment of the display device 400 is further described in some optional implementing manners.

In this embodiment, there is a plurality of implementing manners for the obtaining module 42.

In an optional implementing manner, the obtaining module 42 is specifically configured to:

obtain the third information by transforming all or part of the second information at least according to the first information.

The first information is associated with the transformation.

Optionally, the first information indicates a transformation rule. Correspondingly, the obtaining module 42 is specifically configured to: obtain the third information by transforming all or part of the second information according to the transformation rule.

The transformation rule generally is determined by a transformation manner and at least one transformation parameter. Correspondingly, the first information comprises the transformation manner and at least one transformation parameter of the transformation rule, or the first information comprises at least one transformation parameter of the transformation rule. Specifically, if the first information only comprises the at least one transformation parameter of the transformation rule, the transformation manner of the transformation rule generally is predetermined by the display device and the user.

This implementing manner and specific description of each scenario of this implementing manner can refer to corresponding description of the embodiment of the interaction method provided by the present invention.

In this embodiment, the contact manner comprises a plurality of meanings, and correspondingly, there is a plurality of implementing manners for the determining module 41.

In an optional implementing manner, the contact manner comprises: a holding manner of the display device by the user. Correspondingly, the determining module 41 is specifically configured to: determine the first information at least according to the holding manner.

The holding manner comprises but not limited to at least one of the following: at least one holding hand, and at least one holding position on the display device.

This implementing manner and specific description of each scenario of this implementing manner can refer to corresponding description of the embodiment of interaction method provided by the present invention.

In another implementing manner, the contact manner comprises: a touch operation manner of the display device by the user. Correspondingly, the determining module 41 is specifically configured to determine the first information at least according to the touch operation manner.

The touch operation manner comprises but not limited to any one of the following: number of clicks, touch duration, touch pressure and slide pattern.

This implementing manner and specific description of each scenario of this implementing manner can refer to corresponding description of the embodiment of the interaction method provided by the present invention.

Figure 5:
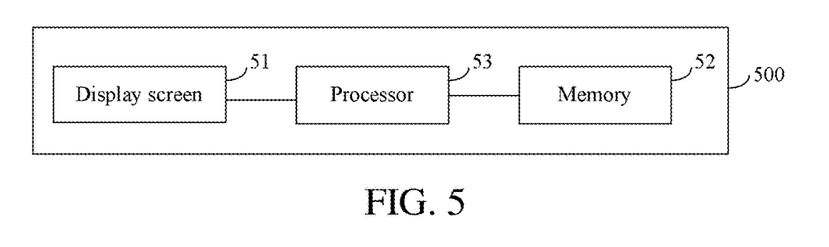
FIG. 5 is a schematic structural diagram of a second embodiment of a display device provided by the present invention.

FIG. 5 is a schematic structural diagram of a second embodiment of a display device provided by the present invention. As shown in FIG. 5, a display device 500 comprises:

at least one display screen 51, configured to display;
a memory 52, configured to store an instruction;
a processor 53, configured to execute the instruction stored by the memory 52, wherein the instruction enables the processor 53 to execute the following operations:

determining first information at least according to a contact manner between a display device 500 and a user;

obtaining third information at least according to the first information and second information to be provided for the user; and controlling the at least one display screen 51 to display the third information.

In this embodiment, the display device 500 can be any device having a display function, comprising but not limited to a cellphone, a tablet computer, a wearable device and a display.

In this embodiment, the at least one display screen 51 is one or more display screens 51, and FIG. 5 shows one display screen 51 and is not intended to limit the number of display screens 51 in the display device 500.

In this embodiment, the memory 52 optionally comprises a high speed RAM (Random-Access Memory), and can optionally comprise a non-volatile memory, for example at least one disk memory.

In this embodiment, the processor 53 can be a central processing unit (CPU), or an application specific integrated circuit (ASIC), or configured as one or more integrated circuits that implement the above operations. The instruction enabling the processor 53 to execute the operations can refer to corresponding description in the interaction method embodiment, which is not described again herein.

In this embodiment, the display device 500 further comprises a touch detection module, configured to detect a contact manner between a display device 500 and the user, wherein the touch detection module optionally is partially positioned in at least one display screen 51, and correspondingly, the at least one display screen 51 can optionally be at least one capacitance screen.

Figure 6:
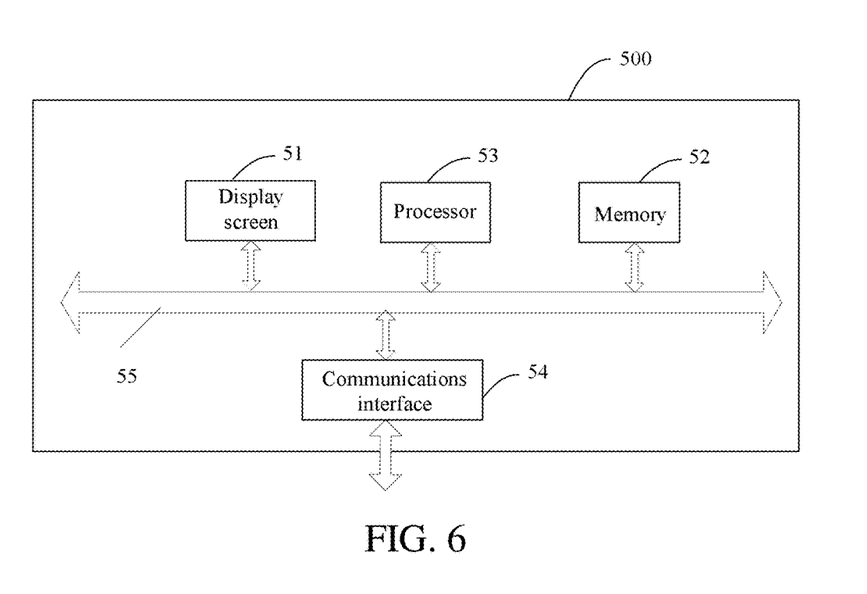
FIG. 6 is a schematic structural diagram of an implementing manner of the embodiment shown in FIG. 5.

In an optional implementing manner, as shown in FIG. 7, the display device 500 further comprises a communications interface 54 and a communications bus 55, wherein the communications interface 54 is configured to communicate between the display device 500 and other devices; and the at least one display screen 51, the memory 52, the processor 53, and the communications interface 54 communicate with each other by the communications bus 55.

Beneficial effects of this embodiment refer to corresponding description in the embodiment of the interaction method provided by the present invention.

It can be appreciated by a person of ordinary skill in the art that, exemplary units and method steps described with reference to the embodiments disclosed in this specification can be implemented by electronic hardware or a combination of computer software and electronic hardware. Whether these functions are executed by hardware or software depends on specific applications and design constraints of the technical solution. A person skilled in the art may use different methods to implement the described functions for each specific application, but such implementation should not be construed as a departure from the scope of the present invention.

If the function is implemented in the form of a software functional unit and is sold or used as an independent product, the product can be stored in a computer-readable storage medium. Based on this understanding, the technical solution of the present invention essentially, or the part that contributes to the prior art, or a part of the technical solution may be embodied in the form of a software product; the computer software product is stored in a storage medium and comprises several instructions for enabling a computer device (which can be a personal computer, a server, a network device, or the like) to execute all or some of the steps of the method in the embodiments of the present invention.

The foregoing storage medium comprises, but not limited to, a USB flash drive, a removable hard disk, a read-only memory (ROM), a random access memory (RAM), a magnetic disk or light disk and other mediums that can be used for storing a program code.

The foregoing implementations are only used to describe the present invention, but not to limit the present invention. A person of ordinary skill in the art can still make various alterations and modifications without departing from the spirit and scope of the present invention; therefore, all equivalent technical solutions also fall within the scope of the present invention and the patent protection scope of the present invention should be subject to the claims.

What is claimed is:

1. An interaction method, comprising:
   determining, by a display device, first information at least according to a contact manner between the display device and a user, wherein the contact manner is unrelated to biometric information of the user;
   obtaining third information at least according to the first information and second information to be provided for the user; and
   displaying the third information,
   wherein the second information comprises real information to be provided to the user by the display device, the third information comprises disguised information corresponding to the real information; and the first information comprises assistant information used for transforming the real information to the disguised information.

2. The method of claim 1, wherein the obtaining third information at least according to the first information and second information to be provided for the user comprises:
   obtaining the third information by transforming all or part of the second information at least according to the first information.

3. The method of claim 2, wherein the first information indicates a transformation rule; and
   the obtaining the third information by transforming all or part of the second information at least according to the first information comprises:
   obtaining the third information by transforming all or part of the second information according to the transformation rule.

4. The method of claim 3, wherein the first information comprises a transformation manner and at least one transformation parameter of the transformation rule, or the first information comprises the at least one transformation parameter of the transformation rule.

5. The method of claim 1, wherein the contact manner comprises: a holding manner of the display device by the user; and
   the determining, by the display device, the first information at least according to the contact manner between the display device and the user comprises: determining, by the display device, the first information at least according to the holding manner.

6. The method of claim 5, wherein the holding manner comprises but not limited to at least one of the following: at least one holding hand, and at least one holding position on the display device.

7. The method of claim 1, wherein the contact manner comprises: a touch operation manner of the display device by the user; and
   the determining, by the display device, the first information at least according to the contact manner between the display device and the user comprises: determining, by the display device, the first information at least according to the touch operation manner.

8. The method of claim 7, wherein the touch operation manner comprises to any one of the following: number of clicks, touch duration, touch pressure and slide pattern.

9. The method of claim 1, wherein the second information comprises any one of the following: an account, a password and a command.

10. A display device, comprising:
    a determining module, configured to determine first information at least according to a contact manner between the display device and a user, wherein the contact manner is unrelated to biometric information of the user;
    an obtaining module, configured to obtain third information at least according to the first information and second information to be provided for the user; and
    a display module, configured to display the third information,
    wherein the second information comprises real information to be provided to the user by the display device, the third information comprises disguised information corresponding to the real information; and the first information comprises assistant information used for transforming the real information to the disguised information.

11. The display device of claim 10, wherein the obtaining module is specifically configured to:
    obtain the third information by transforming all or part of the second information at least according to the first information.

12. The display device of claim 11, wherein the first information indicates a transformation rule; and
    the obtaining module is specifically configured to obtain the third information by transforming all or part of the second information according to the transformation rule.

13. The display device of claim 12, wherein the first information comprises a transformation manner and at least one transformation parameter of the transformation rule, or the first information comprises at least one transformation parameter of the transformation rule.

14. The display device of claim 10, wherein the contact manner comprises: a holding manner of the display device by the user;
    the determining module is specifically configured to determine the first information at least according to the holding manner.

15. The display device according to claim 14, wherein the holding manner comprises at least one of the following: at least one holding hand, and at least one holding position on the display device.

16. The display device of claim 10, wherein the contact manner comprises: a touch operation manner of the display by the user; and
    the determining module is specifically configured to determine the first information at least according to the touch operation manner.

17. The display device of claim 16, wherein the touch operation manner comprises any one of the following: number of clicks, touch duration, touch pressure and slide pattern.

18. The display device of claim 10, wherein the second information comprises any one of the following: an account, a password and a command.

19. A display device, characterized by comprising:
    at least one display screen, configured to display;
    a memory, configured to store an instruction;

a processor, configured to execute the instruction stored by the memory, wherein the instruction enables the processor to execute the following operations:

determining first information at least according to a contact manner between a display device and a user, wherein the contact manner is unrelated to biometric information of the user;

obtaining third information at least according to the first information and second information to be provided for the user; and controlling the at least one display screen to display the third information, wherein the second information comprises real information to be provided to the user by the display device, the third information comprises disguised information corresponding to the real information; and the first information comprises assistant information used for transforming the real information to the disguised information.

* * * * *